Patented Nov. 4, 1941

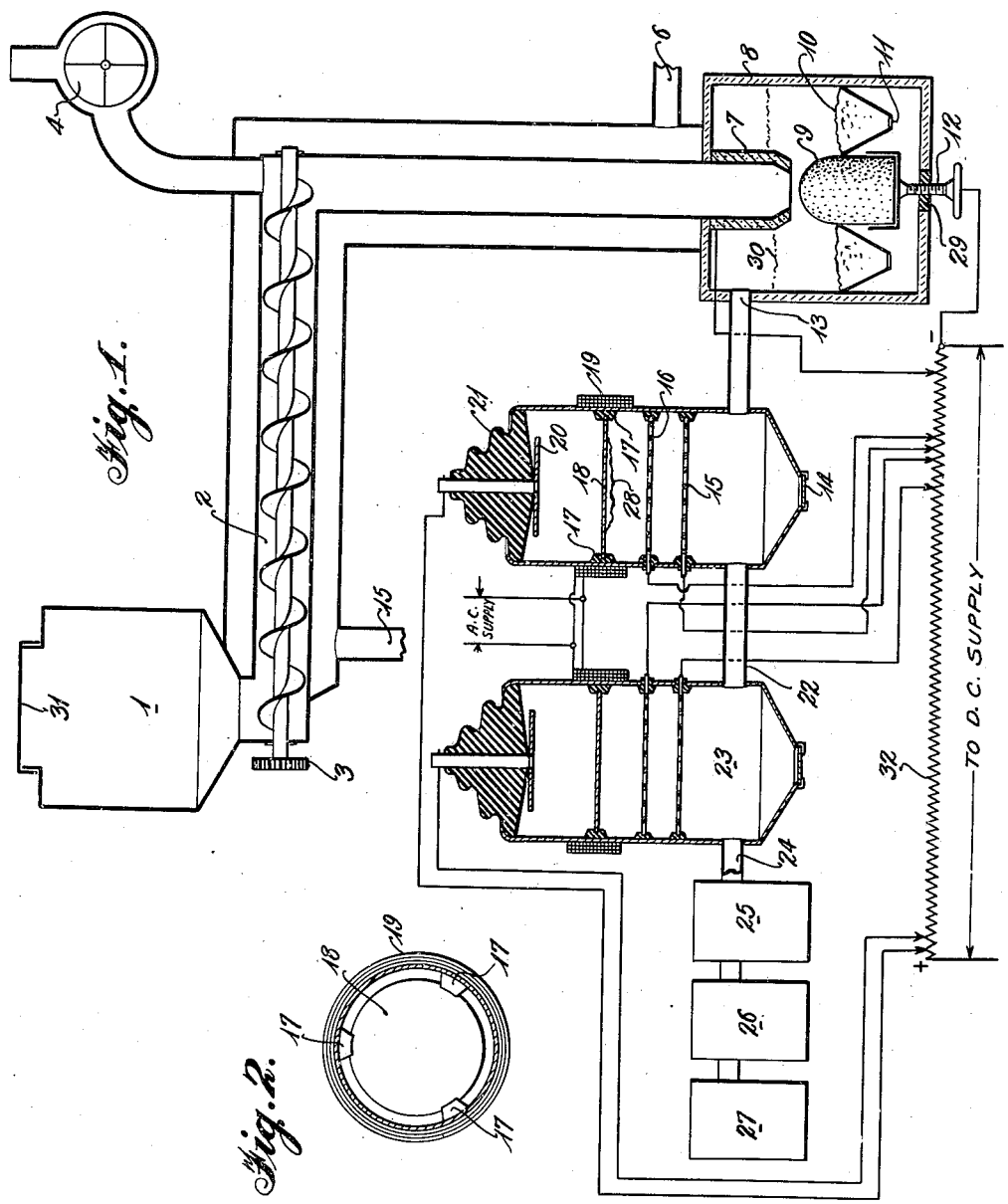

2,261,406

UNITED STATES PATENT OFFICE 2,261,406

ELECTROMETALLURGY

John A. Orme, Los Angeles, Calif.

Application December 14, 1939, Serial No. 309,260

5 Claims. (Cl. 75—10)

This invention relates to a method and means for the separation of metals by selective precipitation of metal ions from a gas phase of vaporized metal and more particularly the invention provides a process involving vaporization of metals and selective precipitation in a pure state of the metals so vaporized under the influence of applied electric potential.

It is well known that the difficulty of obtaining pure metals has hampered commercial as well as research activities employing metals. Chemical purification has been the best available means of freeing such elements of impurities. But at best, the chemical agents used tend to add impurities, although to a minor extent as compared with the original contaminating substances. Such conditions have naturally resulted in a premium being placed on metals of a relatively high degree of purity, as "purity" is evaluated at the present time. Even electrolysis of solutions normally produces an impure produce.

I have now devised a process and apparatus for the purification of metallic elements and the separation of such elements from mixtures thereof in which the purification is carried out in the presence of only those contaminating substances which were present in the original mass which is subjected to treatment, thereby avoiding contamination during the purification step, which process is capable of making extremely accurate separations of pure metals. It is an essential feature of this invention that metallic vapors be subjected to high potential differences of such nature that the components of said vapors are caused to ionize and the metal ions are then precipitated on a suitable solid means by reason of potentials applied to the system. The process takes advantage of the tendency of metals to migrate as ions from a cathode in a high vacuum to be deposited upon an object spaced a short distance therefrom.

Other objects and advantages of the invention will be apparent from the following detailed description thereof when considered in connection with the attached drawing, wherein:

Figure 1 is a diagrammatic showing of a preferred form of apparatus for the purposes of the invention; and Figure 2 is a cross-section of a chamber for precipitation of metals.

Since a high degree of vacuum must be maintained in the apparatus for successful operation, ore or other substance containing impure metal is fed from an air tight hopper 1 by means of a screw conveyor through a pre-heating chamber surrounded by a heating jacket 2. The screw, driven from any suitable source of power through a gear 3 or the like, feeds the material to be treated to the upper end of a vertical shaft discharging into the furnace 8. During passage of the material through the pre-heating chamber and shaft; water, gases and other impurities volatile at relatively low temperatures are driven off and removed from the system by vacuum pump 4. A supply of heat exchange medium is constantly circulated through the jacket 2 from inlet 6 to outlet 5.

A hollow electrode 7 is provided in the upper end of furnace 8, preferably so positioned that the interior thereof forms a continuation of the vertical shaft. Disposed below the open end of electrode 7 is a second electrode 9 within the crucible 10. Material falling through the space between electrodes 7 and 9 is fused and vaporized to a large extent in the arc established between the said electrodes. High current densities are maintained between these electrodes at potentials ranging upward from about 50 volts. In most operations, the level of molten material is not permitted to rise into the gap between electrodes but is maintained at about the level shown in full lines. However in the purification of aluminum and some other metals of similar character, the level of fluid is preferably at the level 30 indicated in broken lines. In the latter case, the arc requires higher current densities. To provide adjustability electrode 9 is mounted on a screw 12 or the like embedded in an insulator 29. Tap holes 11 are formed on the under side of the crucible.

Metallic vapors produced in the furnace 8 are passed therefrom through conduit 13 to the selective precipitation chambers 23. In each of these chambers there is a pair of electrode grids 15 and 16, a plate 18 and a control electrode 20. Each of these electrodes and the plate in the precipitation chamber is suitably insulated from the walls thereof, the plate 18 being mounted in insulating blocks 17 while the control electrode 20 is provided with a heavy insulator 21 because of the high potentials normally applied to this member during operation of the chamber. Surrounding the plate 18 is an induction coil which serves a purpose to be hereinafter more fully described.

Preferably, a plurality of precipitation chambers 23 are connected to the furnace 8, either in parallel, or in series as shown. In the embodiment illustrated, the lower end of a second chamber 23 is connected to the first chamber by a conduit 22, while a conduit 24 furnishes a communication between chamber 23 and a trap 25 for the removal of substances which are injurious to the vacuum pumps 26 and 27 from the gases to be removed from the system. These pumps are required for the elimination of occluded gases and the like.

Each chamber 23 acts to precipitate metal selectively upon the plate 18 as indicated generally at 28. Conditions within the chamber are so adjusted that grid 16 is negative with respect to grid 15 and control electrode 20, establishing a virtual cathode in space. Metallic vapors are ionized between the furnace electrodes and grid 15, migrate to grid 16 and, under the influence of a high positive potential on control electrode 20 are projected toward said control electrode and deposited on the plate 18, to which no potential is applied. The mechanism of the process is not thoroughly understood but it is known that metals may be separated thereby in a state of phenomenal purity with the expenditure of a very small amount of power.

The potentials applied to various parts of the apparatus are capable of wide variation, but a number of experimental runs on various types of metallic mixtures indicates that very good results are obtained by establishing a potential difference in excess of 50 volts between the furnace electrodes 7 and 8 while the grid 15 is maintained at a positive potential of 100 to 1000 volts with respect to the closer furnace electrode (electrode 7 in the embodiment illustrated). It appears to be important that the current between the furnace electrodes be relatively high, usually at least 100 amperes, preferably between 100 and 500 amperes. All conductors for applying potential to the apparatus are preferably connected to sources of potential adapted to rather flexible control in order that relative potentials may be varied within wide limits. One suitable means for accomplishing this result is the power pack indicated generally at 32. This enables the operator to clean deposits of metal from those parts of the apparatus not intended to receive the same by bombardment.

Grid 16 is conveniently maintained at a proper potential with respect to grid 15 by connecting the former to electrode 7, but it is advisable in most cases to provide an independent control on the source of potential for each of the electrodes.

It has been found that the selectivity of metal deposit on plate 18 may be readily controlled by maintenance of proper values for two important variables, namely pressure and the potential of control electrode 20, which latter should be at least 1000 volts greater than that of grid 16. Palladium is deposited at the highest pressure and the lowest positive potential on electrode 20 of any of the metals investigated. The following series shows the order in which a number of metals are deposited under conditions of decreased pressure and increased control potential at electrode 20: Palladium, gold, silver, lead, tin, platinum, copper, cadmium, nickel, indium, and iron.

In addition to the above, aluminum has been selectively deposited. This metal cannot be accurately fitted into the series at present. It was found that this particular element is best deposited in a rare atmosphere of a mono-atomic gas such as helium.

The following specific examples illustrate preferred operations in connection with two of the precious metals.

*Example I.*—Silver was deposited at an absolute pressure of $1 \times 10^{-2}$ mm. of mercury using substantially the following potentials with respect to furnace electrode 7:

|  | Volts |
|---|---|
| Furnace electrode 8 | −150 |
| Grid 15 | +200 |
| Grid 16 | +100 |
| Control electrode 20 | +12,000 |

*Example II.*—Gold was deposited at an absolute pressure of $2 \times 10^{-2}$ mm. of mercury and substantially the following potentials with respect to furnace electrode 7:

|  | Volts |
|---|---|
| Furnace electrode 8 | −150 |
| Grid 15 | +200 |
| Grid 16 | +150 |
| Control electrode 20 | +10,000 |

For successful operation the pressure should be maintained at a value not substantially in excess of 1 mm. of mercury, absolute, but commercial operation normally requires lower pressures for successful operation.

When a substantial deposit of metal has been built up on the plate 18, an alternating current may be passed through the induction coil 19, thereby setting up eddy currents in said metal to melt the same. The molten metal may then be tapped off through the port 14.

It will be readily understood that the process is capable of wide variation within the scope of the invention, but it appears that best results are obtained when plate 18 is positioned in the region of the chamber corresponding to the "Crookes dark space" of the chamber, which chamber is, in effect, a vacuum tube of the "Gessler" type.

I claim:

1. A process for separating a pure metal from a substance containing the same comprising subjecting said substance to conditions to vaporize metallic constituents thereof, passing the resulting vapor at a pressure not substantially greater than 1 mm. of mercury to one end of an enclosed precipitation zone, maintaining adjacent said end in succession a first region of electric potential, a second region of potential negative with respect to said first region, a third region of potential at least 1000 volts positive with respect to said second region and depositing said metal on a solid object between said second and third regions.

2. A process according to claim 1 characterized in that said constituents are vaporized in an electric arc under a potential of at least 50 volts and current of at least 100 amperes.

3. A process according to claim 1 for preparing pure gold characterized in that said constituents are vaporized in an electric arc under a potential of at least 50 volts and a current of at least 100 amperes, passed to said zone from one end of said arc and that the potentials of said regions with respect to said end of said arc are substantially as follows:

Said first region +200 volts
Said second region +150 volts
Said third region +10,000 volts 4. A process according to claim 1 for preparing pure silver characterized in that said constituents are vaporized in an electric arc under a potential of at least 50 volts and a current of at least 100 amperes, passed to said zone from one end of said arc and that the potentials of said regions with respect to said end of said arc are substantially as follows:

Said first region+200 volts
    Said second region+100 volts
    Said third region+12,000 volts 5. In an apparatus for separating metals including means to vaporize metallic material and means to selectively precipitate metals from materials so vaporized, a deposition chamber, a conduit to conduct vapor to said chamber from said means to vaporize metallic material, a first grid across said chamber adjacent said conduit, a second grid across said chamber on the side of said first grid remote from said conduit, a high potential electrode in one end of said chamber on the side of said second grid remote from said conduit, a plate between said electrode and said second grid and means to withdraw gaseous material from the system.

JOHN A. ORME.